United States Patent [19]

Blanton, Jr. et al.

[11] 4,165,275
[45] Aug. 21, 1979

[54] LOWERING SULFUR OXIDE OUTPUT FROM CATALYST REGENERATION

[75] Inventors: William A. Blanton, Jr., San Anselmo; Donald W. Blakely, Oakland, both of Calif.

[73] Assignee: Chevron Research Company, San Francisco, Calif.

[21] Appl. No.: 861,319

[22] Filed: Dec. 16, 1977

[51] Int. Cl.² .................. C10G 11/04; B01J 21/20; C01B 17/60; B01J 29/12

[52] U.S. Cl. .................. 208/113; 208/120; 252/417; 423/244; 423/563

[58] Field of Search ............ 208/113, 120; 423/244

[56] References Cited

U.S. PATENT DOCUMENTS

| | | |
|---|---|---|
| 3,501,897 | 3/1970 | Van Helden et al. ........... 423/244 X |
| 3,615,196 | 10/1971 | Welty et al. .................. 423/244 X |
| 3,739,550 | 6/1973 | Martin et al. ................. 423/244 X |
| 3,816,597 | 6/1974 | Smith ........................ 423/244 |
| 4,071,436 | 1/1978 | Blanton et al. ............... 208/120 |
| 4,091,076 | 5/1978 | Vogel et al. ................. 423/244 |
| 4,115,249 | 9/1978 | Blanton et al. ............... 208/120 |
| 4,115,250 | 9/1978 | Blanton et al. ............... 208/120 |
| 4,115,251 | 9/1978 | Blanton et al. ............... 208/120 |

Primary Examiner—Delbert E. Gantz
Assistant Examiner—G. E. Schmitkons
Attorney, Agent, or Firm—D. A. Newell; R. H. Davies; W. D. Reese

[57] ABSTRACT

Sulfur oxides in flue gas formed during cracking catalyst regeneration are reacted with a zeolitic crystalline aluminosilicate containing sodium cations in the catalyst regenerator to form a sulfur-containing solid, and the sulfur component is removed from the crystalline aluminosilicate in the cracking reactor by contacting the sulfur-containing solid with the hydrocarbon feed.

10 Claims, No Drawings

LOWERING SULFUR OXIDE OUTPUT FROM CATALYST REGENERATION

BACKGROUND OF THE INVENTION

The present invention relates to a method for reducing the level of sulfur oxide emissions from a catalytic hydrocarbon cracking process.

Commercial catalytic hydrocarbon cracking systems employ catalyst in a moving bed or fluidized bed. The catalyst cycles between a cracking reactor and a catalyst regeneration vessel. In a fluidized catalytic cracking (FCC) operation, a stream of hydrocarbon feed is contacted with catalyst particles in a riser reactor or reactor vessel, usually at a temperature of about 800°-1100° F. The reactions of hydrocarbons in the hydrocarbon stream at this temperature result in deposition of carbonaceous coke on the catalyst particles. The resulting fluid products, including hydrocarbons, hydrogen, etc., are thereafter separated from the coked catalyst and are withdrawn from the cracking zone. The coked catalyst is then typically stripped of volatiles and is passed from the reactor into a catalyst regeneration zone. In the regenerator, the coked catalyst is contacted with a fluidizing gas containing a controlled amount of molecular oxygen. The coke is burned off the catalyst to a desired low coke level and simultaneously the catalyst is heated to a high temperature required when the catalyst is returned to the reactor for cracking. After the regeneration is finished, the catalyst is returned to the cracking zone, where it is used again to vaporize the hydrocarbons and catalyze cracking. The flue gas formed by combustion of coke in the regenerator is separately removed from the regenerator. The flue gas may be treated to remove particulates and carbon monoxide from it, and is then typically passed into the atmosphere. Concern with the control of emission of pollutants in the flue gas has resulted in a search for improved methods for controlling the pollutants such as carbon monoxide and sulfur oxides.

The hydrocarbon feeds normally processed in commercial FCC units contain at least some sulfur, which is normally termed "feed sulfur". Usually, about 2–10% or more of the feed sulfur present in hydrocarbon streams processed in a given FCC unit is transferred from the feed stream to the particles of catalyst as a part of the coke deposited on the catalyst particles. Sulfur which is deposited on a catalyst is herein termed "coke sulfur". The coke sulfur is eventually passed from the reaction zone into the catalyst regenerator along with the coked catalyst. In this way, about 2–10% or more of the sulfur present in the feed is continuously passed into the catalyst regeneration zone. In the regenerator, the coke sulfur is burned, along with the carbon and hydrogen in the coke. The coke sulfur forms gaseous sulfur dioxide and sulfur trioxide. These gases are then conventionally removed from the regenerator in the flue gas.

The prior art has suggested diminishing the amount of sulfur oxides in FCC regenerator flue gas by desulfurizing the hydrocarbon feed in a separate desulfurization unit prior to undertaking the FCC operation. Another method for reducing the amount of sulfur oxides in the flue gas is by conventional flue gas desulfurization after removal of the flue gas from the FCC regenerator. These two alternatives both require elaborate extraneous equipment and energy input, and for this reason are not highly desirable ways to control the sulfur oxides.

Most of the sulfur contained in the hydrocarbon feed does not become coke sulfur in the cracking reactor. Instead, it is converted either to normally gaseous sulfur compounds such as hydrogen sulfide and carbon oxysulfide or else is converted to normally liquid organic sulfur compounds. These gaseous and liquid sulfur compounds are removed from the cracking reaction zone and carried along with the vapor products which are recovered. Thus, about 90% or more of the feed sulfur is continuously removed from the cracking reactor in the stream of processed, cracked hydrocarbons. About 40–60% of the sulfur mixed with the cracked hydrocarbons is in the form of hydrogen sulfide. For this reason, it is necessary to make provisions for recovering hydrogen sulfide from the effluent from the FCC reactor. In a typical commercial operation, a very-low-molecular-weight offgas stream is separated from the $C_3+$ liquid hydrocarbons in a gas recovery unit, and the offgas is then treated, e.g., by scrubbing it with an amine solution, to remove the hydrogen sulfide. Removal of hydrogen sulfide and other sulfur compounds from the fluid effluent from the cracking reactor is rather simple and inexpensive as compared to the methods which must be used to remove sulfur oxides from the FCC regenerator flue gas by any conventional method. Thus, if all the sulfur which is now passed into the regenerator and removed from the cracking unit as in the flue gas could be shifted into a single recovery operation already performed on the cracking reactor offgas, the use of two separate sulfur recovery operations in an FCC system could be obviated. The sulfur forming the coke sulfur could then be removed from the FCC system as simply a small addition to the large amount of sulfur in the feed which is already removed with the vapor products. The small added expense, if any, of increasing the amount of hydrogen sulfide by 5–15% is substantially less than the expense of either separate feed desulfurization or flue gas desulfurization. Reactor offgas systems in most conventional FCC units usually have the capacity to remove more hydrogen sulfide from the offgas than is now required. Thus, it is apparent that it would be desirable to direct substantially all the sulfur in the feed into a path which led to its removal from the cracking unit in the vapor cracked products stream and reduced the amount of sulfur oxides leaving the system in the regenerator flue gas.

It has been suggested, e.g., in U.S. Pat. No. 3,699,037, to lower the amount of sulfur oxides in regenerator flue gas by adding particles of Group II-A metal oxides and/or carbonates, such as dolomite, MgO or $CaCO_3$, to the circulating catalyst in an FCC unit. The Group II-A metals react with sulfur oxides in the flue gas to form solid sulfur-containing compounds. The Group II-A metal oxides do not have sufficient physical strength to remain as particles in the unit, and regardless of the size of the particles introduced, they are rapidly reduced to fines by attrition and pass out of the FCC unit along with the catalyst fines. Thus, addition of particles of Group II-A metals is a continuous, once-through type operation, so that large amounts of these materials must be introduced on a regular basis into the unit in order to substantially reduce the level of sulfur oxides in the regenerator flue gas.

It has also been suggested, e.g., in U.S. Pat. No. 3,835,031, to lower the level of sulfur oxides in an FCC regenerator flue gas by impregnating a Group II-A metal oxide onto a conventional silica-alumina cracking catalyst. The attrition problem encountered when using unsupported Group II-A metal compounds is thereby either eliminated or reduced. Unfortunately, the Group II-A metals, such as magnesia, have an undesirable effect on the activity and selectivity of cracking catalysts. Addition of Group II-A metal compounds to cracking catalyst has two noticeably adverse effects on the results obtained in the cracking operation. First, the yield of the liquid hydrocarbon fraction recovered from the cracking operation is substantially lowered, typically by greater than 1 volume percent of the feed volume. Second, the octane rating of the gasoline or naphtha fraction (75°–435° boiling range) is substantially lowered. Both of the above-noted consequences are seriously detrimental to the economic viability of an FCC cracking operation. Complete removal of sulfur oxides from the regenerator flue gas would thus not compensate for the losses in yield and octane which would result from adding Group II-A metals to an FCC catalyst.

A copending U.S. patent application, Ser. No. 666,115, filed on Mar. 11, 1976 (now U.S. Pat. No. 4,071,436), discloses the use of alumina included in a particulate solid other than particulate FCC catalysts or included as a separate phase in the particulate FCC catalyst for the purpose of removing sulfur oxides from FCC regenerator flue gas. The patent application teaches that the alumina used in the operation should preferably be substantially free from silica, since the presence of silica in intimate combination with the alumina renders the alumina wholly or partially inactive for the intended use.

U.S. Pat. No. 3,953,587 describes the use of hydrogen-form and sodium-exchanged zeolites to form sulfur by treatment of a gas-containing low concentrations of hydrogen sulfide and sulfur dioxides, such as Claus-plant effluents. The reaction temperature for the sulfur formation step is 400°–700° F., and the zeolite material is thereafter regenerated and the sulfur recovered by heating the zeolite to 800°–1000° F. in an inert atmosphere to vaporize the sulfur.

U.S. Pat. No. 3,988,129 describes a process in which sulfur dioxide is adsorbed on a zeolitic crystalline aluminosilicate at a temperature of 10°–50° C., the sulfur dioxide is subsequently desorbed by an air stream 150°–350° C., and the zeolite is then cooled in air to the adsorption temperature.

Various catalysts containing vanadium, especially those containing vanadate ions, such as potassium vanadate, are well known as catalysts for the oxidation of sulfur dioxide to form sulfur trioxide.

SUMMARY OF THE INVENTION

The present invention resides in an improved method for decreasing the amount of sulfur oxides in flue gas formed in an FCC catalyst regenerator. The method is used in a catalytic cracking process including the steps of cracking a sulfur-containing hydrocarbon stream in contact with the fluidized bed of particulate cracking catalyst in a cracking zone at cracking conditions including a temperature in the range from 800°–1300° F., whereby sulfur-containing coke is deposited on the catalyst, and removing a hydrocarbon effluent from the cracking zone; passing coke-containing catalyst with sulfur-containing coke deposited thereon from the cracking zone and an oxygen-containing gas into a cracking catalyst regeneration zone, burning off the sulfur-containing coke in the regeneration zone at a temperature in the range from 1000°–1500° F. to form the sulfur-oxide-containing flue gas, and removing the flue gas from the regeneration zone; and returning the coked-depleted catalyst from the regeneration zone to contact with the hydrocarbon stream in the cracking zone in which the improvement for decreasing the amount of sulfur dioxides in the flue gas comprises the steps of:

(1) forming at least one sulfur-containing solid material by contacting the sulfur-oxide containing flue gas with a zeolitic crystalline aluminosilicate at a temperature in the range from 1000° F. to 1500° F., at least a major proportion of ion-exchangeable cations in the aluminosilicate being selected from sodium cations and potassium cations, whereby a substantial portion of sulfur in the sulfur oxides combines with the aluminosilicate to form the sulfur-containing solid material and separating the remaining flue gas from the sulfur-containing solid material; and (2) forming fluid sulfur compounds by contacting the hydrocarbon stream with the sulfur-containing solid material at a temperature in the range from 800° F. to 1300° F.

In a more limited, preferred embodiment, the present method includes forming at least one sulfur-containing solid material by contacting sulfur oxides in the FCC regenerator flue gas with a zeolitic crystalline aluminosilicate contained in a particulate solid other than the particulate catalyst, with the particulate solid being circulated in physical mixture with catalyst particles.

In another limited embodiment of the invention, the method includes forming at least one sulfur-containing solid material by contacting a zeolitic crystalline aluminosilicate included in at least a portion of the coke-depleted particulate catalyst with sulfur oxides in the flue gas in the regeneration zone.

In a particularly preferred embodiment of the invention, the aluminosilicate used for forming the sulfur-containing solid material is associated with a compound of vanadium, which may be in the form of a minor proportion of vanadium cations exchanged into the crystalline aluminosilicate structure. Alternatively, or in conjunction therewith, the particulate solid including the aluminosilicate may have either cationic vanadium ions or anionic vanadium-containing ions impregnated thereon in a form other than as vanadium cations in the crystal structure of the crystalline aluminosilicate.

The faujasite-type zeolites are particularly preferred for use in the present method, particularly zeolite X- and zeolite Y-type crystalline structures.

DETAILED DESCRIPTION OF THE INVENTION

The present invention is used in connection with a process for fluidized catalytic cracking of hydrocarbon feeds. The same sulfur-containing hydrocarbon feeds normally processed in commercial FCC systems may be processed in the cracking system employing the present invention. Suitable feedstocks include, for example, gas-oils, light cycle oils, heavy cycle oils, etc., which usually contain about 0.1–10 weight percent sulfur. Residual feedstocks may also be processed in an FCC system, and usually contain sulfur concentrations even higher than the lighter FCC feeds. Sulfur may be present in the feed as a thiophene, disulfide, thioether, etc. Typically, suitable feedstocks for fluid catalytic cracking normally boil in the range from about 400°–1100° F. A suitable feed hydrocarbon may include recycled hydrocarbons which have already been subjected to cracking.

In embodiments of the present method in which the sodium or potassium exchanged zeolite is added to the FCC system in a particulate solid other than the FCC catalyst, the cracking catalyst employed may be a conventional particulate cracking catalyst including silica and alumina. The catalyst may be a conventional amorphous cracking catalyst containing a mixture of silica and alumina, or more preferably the catalyst may be a conventional zeolite-containing cracking catalyst including a catalytically active zeolitic crystalline aluminosilicate having a high acidity and being associated with an amorphous matrix which is generally composed of silica and alumina. The amorphous matrix generally constitutes 70–95 weight percent of the cracking catalyst, with the remaining 5–30 weight percent of the catalyst being comprised of the acidic zeolite dispersed or embedded in the matrix. The acidic zeolite in the catalyst may be in hydrogen form or may be rare earth-exchanged or exchanged with other suitable ions. Conventional zeolite-containing cracking catalysts often include X-type zeolite structures or Y-type zeolite structures.

Cracking conditions employed in the cracking or conversion step in an FCC system are frequently provided in part by preheating or heat-exchanging hydrocarbon feeds to bring the feeds to the temperature of about 600°–750° F. before they are introduced into the cracking zone; however, preheating of feeds used in processes employing the present improved method is not essential. Cracking conditions include a catalyst/hydrocarbon weight ratio of about 3 to about 10. A hydrocarbon weight hourly space velocity in the cracking zone of about 2 to about 50 per hour is preferably used. The average amount of coke contained in the spent catalyst after contact with the hydrocarbons in the cracking zone, at the time the catalyst is passed into the regenerator, is preferably between about 0.5 weight percent and about 25 weight percent, depending in part on the carbon content of regenerated catalyst in the particular FCC system, as well as on the heat balance of the particular system.

The catalyst regeneration zone used in an FCC system employing an embodiment of the present invention may be of any conventional design. The gaseous atmosphere inside the regeneration zone is normally comprised of a mixture of gases in concentrations which vary according to the locus within the regenerator. The concentration of gases also varies according to the coke concentration on catalyst particles entering the regenerator and according to the amount of molecular oxygen and steam entering the regenerator. Generally, the gaseous atmosphere in the regenerator contains 5–25% steam, varying amounts of oxygen, carbon monoxide, nitrogen, carbon dioxide, sulfur dioxide, and sulfur trioxide. In order to facilitate removal of sulfur dioxide from the regenerator flue gas within the regenerator according to the present invention, it is preferred that relatively coke-free particles of the crystalline aluminosilicate-containing sodium cations contact the gaseous regenerator atmosphere at a locus at which the atmosphere contains sulfur trioxide or molecular oxygen and sulfur dioxide. In regenerators of conventional design, the flue gas in the regenerator includes the desired components and the FCC catalyst particles normally contact the flue gas at a locus where the flue gas contains sulfur dioxide. When regenerators of this type are employed, contact between the relatively coke-free sodium zeolite and the oxygen and sulfur dioxide or sulfur trioxide is facilitated.

The zeolitic crystalline aluminosilicates suitable for use in carrying out the method of the present invention are those having average pore diameters of 4–15 Angstroms, and having at least a majority of the ion-exchangeable cationic sites thereof filled by sodium cations or potassium cations, or by a combination of sodium and potassium cations. Preferably the zeolite used in the present method has at least 80% of the ion-exchangeable cationic sites thereof filled by cations selected from potassium and sodium cations. As will be apparent to those skilled in the art, the actual weight percent of sodium or potassium, or both, in the zeolite chosen will depend on the composition and crystal structure of the particular zeolite. For example, when zeolite X is synthesized in the sodium form, it has a sodium content (calculated as sodium oxide) on the order of about 22 weight percent (dry basis), and essentially all the cationic ion-exchangeable sites are filled by sodium cations. Other zeolites will, of course, have weight percents of sodium oxide which differ substantially from that of sodium zeolite X, even when the same proportions of the total number of ion-exchangeable cationic sites are filled by sodium cations. Suitable zeolites, in addition to zeolite X, include zeolite A, zeolite B, zeolite F, zeolite H, zeolite K-G, zeolite L, zeolite M, zeolite Q, zeolite R, zeolite T, zeolite Y, mordenite, erionite, offretite, ferrierite, chabazite, clinoptilolite, gmelinite, phillipsite and faujasite. Particularly preferred zeolites for use in carrying out the present invention are those having a faujasite-type crystal structure, especially natural faujasite, zeolite X and zeolite Y.

Most of the suitable zeolites are conventionally synthesized in the alkali metal form, usually with the ion-exchangeable cationic sites being filled primarily by sodium cations. Thus, many of the suitable zeolites can be used directly as synthesized, and need not be further processed after synthesis in order to introduce the desired cations. In cases where the particular zeolite to be used is in a form in which it does not have a major proportion of its cationic ion-exchangeable sites filled by sodium or potassium cations, then sodium or potassium cations can be exchanged into the crystal structure of the zeolite by well-known techniques. Thus, suitable sodium-exchanged, potassium-exchanged, or sodium-and-potassium-exchanged zeolites may be prepared from hydrogen-form zeolites, so-called ultra-stable zeolites, zeolites containing rare earth cations, and like commercially produced zeolites, by ion-exchanging such zeolites with an aqueous solution of sodium chloride, potassium chloride, or by other conventional procedures.

The sodium- or potassium-form zeolite may be utilized in an FCC system in at least two modes. In a preferred mode of use, a particulate solid other than the FCC catalyst particles is introduced into circulation in the FCC system in physical mixture with the cracking catalyst. The particulate solid includes the sodium-form or potassium-form zeolite. The sulfur oxides in the regenerator flue gas react with the zeolite in the particulate solid to form a solid sulfur-containing material, e.g., a sulfate of aluminum. The particulate solid is cycled between the reactor and the regenerator in the same manner as the catalyst. The zeolite may alternatively be included as a phase, or component, of the particulate FCC catalyst itself, with the sodium or potassium zeolite being incorporated into the catalyst during manufacture. The sulfur oxides in the flue gas, in this case, react with the zeolite in the catalyst particles to form a sulfur-containing solid.

Zeolites are almost invariably composited with a binder or matrix material for any commercial uses. In carrying out the present invention, if the sodium- or potassium-containing zeolite is included as a component of the particulate cracking catalyst, then the matrix component of the cracking catalyst will provide a suitable binder for the sodium or potassium zeolite, as well as for the conventional, active zeolitic cracking component of the catalyst. If, in carrying out the invention, the sodium- or potassium-exchanged zeolite is added to the FCC system as a component of a particulate solid other than the catalyst, with the particulate solid being circulated in the system physically mixed with the catalyst particles, then the zeolite is preferably composited with a binder or matrix. Examples of suitable binder materials are silica, alumina, silica-alumina, natural or synthetic clays, and other similar refractory materials with relatively high physical strength. A particularly preferred binder material for use in connection with the sodium or potassium zeolites is alumina. The amount of the sodium or potassium zeolite in the separate particulate solid may be between 0.1 and 100 weight percent of the particulate solid. An amount of the zeolite in the range from 5 to 30 weight percent is a preferred concentration range, and an amount of the zeolite in the range 60 to 80 weight percent of the particulate solid is also a preferred concentration range.

In one preferred embodiment of the invention, the sodium- or potassium-exchanged zeolite is associated with a vanadium component. The vanadium component may be present in cations which are exchanged into the cationic ion-exchangeable sites in the zeolite. In this case, the vanadium-containing cations may occupy up to 20% of the cationic ion-exchangeable sites in the zeolite. The vanadium component may also be included simply as cations including vanadium which are impregnated into the zeolite-containing particles (which may be either catalyst particles or distinct particulate solids physically mixed with the catalyst) to be circulated in the FCC system. The vanadium thus need not be part of the crystal structure of the zeolite, although it can be. The vanadium component may also be included as anions containing vanadium, which may be impregnated into the sodium- or potassium-containing zeolite particles, e.g., as vanadate ions.

The amount of vanadium to be included in the particulate solid which includes the sodium or potassium zeolite may be between 0.001 weight percent and 4 weight percent of the total weight of the sodium-, vanadium-, and potassium-exchanged zeolite present in the particulate solid. The amount of vanadium present is calculated on the basis that all vanadium is present as the element metal, irrespective of the actual form in which the vanadium is present. Preferably the amount of vanadium in the particle, if vanadium is used, is between 0.1 and 2 weight percent of the total weight of vanadium-, potassium- and sodium-containing zeolite in the particle. The weight percent of vanadium is calculated with respect to the total weight of zeolite having at least a major proportion of cationic sites thereof filled by sodium or potassium cations, and which is present in the same particle with the vanadium. The weight ranges of vanadium can be used only in addition to observance of the requirement noted above that not more than 20 weight percent of the cationic ion-exchangeable sites in the zeolite are filled with vanadium cations.

The sodium- or potassium-exchanged zeolite is preferably used in an FCC system in an amount between about 0.01 weight percent and 10 weight percent of the total weight of catalyst which is being circulated in the FCC system.

Particularly preferably, the sodium- or potassium-exchanged zeolite is used in an amount between 1 and 5 weight percent of the amount of catalyst circulating in the system. In an FCC system in which the present invention is being carried out, the weight percent of sodium- or potassium-exchanged zeolite in the system is to be kept at a level such that the amount of zeolite is generally within the above-indicated weight percent ranges for a sample taken at any point within the system.

PREFERRED EMBODIMENT OF THE INVENTION

In a preferred embodiment of the present invention, the method is carried out in a conventional FCC system. A hydrocarbon feed stream boiling between 450° and 950° F. is supplied to the system for cracking. The hydrocarbon feed stream contains 2 weight percent sulfur. A conventional particulate FCC catalyst is used. The catalyst includes about 10 weight percent of zeolitic crystalline aluminosilicate having a low alkali metal content (less than 2 weight percent) and a high acidity and cracking activity. The cracking zeolite component is associated with a conventional silica-alumina matrix. In operating prior to introduction of the sodium-exchanged zeolite according to the invention, about 2 weight percent of the coke which is deposited on the spent catalyst in the system is sulfur, and the flue gas generated in the FCC catalyst regenerator is found to contain about 1500 parts per million (volume) of sulfur oxides (calculated as $SO_2$). Using conventional cracking conditions and catalyst regeneration conditions 2 weight percent of a sodium-exchanged type X zeolite having about 90 weight percent of the ion-exchangeable cationic sites thereof filled by sodium cations and about 10% filled by vanadium cations is added to the system according to the invention. The sodium- and vanadium-exchanged type X zeolite is composited with an alumina matrix in particles having a zeolite/alumina weight ratio of 0.25. After addition of the sodium- and vanadium-exchanged type X-zeolite to the system, and circulation of the sodium-vanadium-X zeolite-containing particles through the system in physical mixture with the cracking catalyst, it is found that the sulfur oxide concentration in the flue gas taken from the FCC catalyst regenerator has been lowered substantially from the original high level. The sodium-vanadium-X zeolite reacts with sulfur oxides in the FCC catalyst regenerator at the conventional FCC catalyst regeneration conditions maintained therein to form a sulfur-containing solid material in the particles containing the zeolite. The sulfur-containing solid material may be a sulfate of aluminum, for example. The sulfur-containing solid material is then passed to the FCC reactor along with regenerated catalyst. Fluid sulfur compounds, such as hydrogen sulfide, are formed in the cracking reaction zone (which includes a riser as well as a reaction vessel) by contacting the sulfur-containing solid with the hydrocarbon feed at cracking conditions. The fluid sulfur compounds formed thereby are removed from the reactor along with the hydrocarbon stream recovered from the reactor. The sodium-vanadium-X zeolite is then recycled to the FCC catalyst regenerator along with spent catalyst for further use in removing sulfur oxides from the regenerator flue gas.

A preferred embodiment of the invention having been described, the broader scope of the invention will be apparent. Modifications and variations of the above-described procedure are clearly apparent from the foregoing description, and are intended to be included within the scope of the invention as defined in the following claims.

What is claimed is:

1. In a fluid catalyst cracking process including the steps of (a) cracking a sulfur-containing hydrocarbon stream in contact with a fluidized bed of a particulate cracking catalyst in a cracking zone at cracking conditions including a temperature in the range from 800° F. to 1300° F., whereby sulfur-containing coke is deposited on said catalyst, and removing a hydrocarbon effluent from said cracking zone, (b) passing catalyst with sulfur-containing coke deposited thereon from said cracking zone and an oxygen-containing gas into a cracking catalyst regeneration zone, burning off said sulfur-containing coke therein at a temperature in the range from 1000° F. to 1500° F. to form a flue gas containing sulfur oxides, and removing said flue gas from said catalyst regeneration zone; and (c) returning the resulting coke-depleted catalyst from said catalyst regeneration zone to contact with said hydrocarbon stream in said cracking zone; the method for decreasing the amount of sulfur oxides in said flue gas which comprises the steps of:

(1) forming at least one sulfur-containing solid material by contacting said sulfur oxide-containing flue gas with a zeolitic crystalline aluminosilicate at a temperature in the range from 1000° F. to 1500° F., at least a majority of ion-exchangeable cationic sites in said aluminosilicate being filled by cations selected from sodium cations and potassium cations, whereby a substantial portion of sulfur in said sulfur oxides combines with said aluminosilicate to form said sulfur-containing solid material and separating the remaining flue gas from said sulfur-containing solid material; and (2) forming fluid sulfur compounds by contacting said hydrocarbon stream with said sulfur-containing solid material at a temperature in the range from 800° F. to 1300° F.

2. In a fluid catalyst cracking process including the steps of (a) cracking a sulfur-containing hydrocarbon stream in contact with a fluidized bed of a particulate cracking catalyst in a cracking zone at cracking conditions including a temperature in the range from 800° F. to 1300° F., whereby sulfur-containing coke is deposited on said catalyst, and removing a hydrocarbon effluent from said cracking zone; (b) passing catalyst with sulfur-containing coke deposited thereon from said cracking zone and an oxygen-containing gas into a cracking catalyst regeneration zone, burning off said sulfur-containing coke therein at a temperature in the range from 1000° F. to 1500° F. to form a flue gas containing sulfur oxides, and removing said flue gas from said catalyst regeneration zone; and (C) returning the resulting coke-depleted catalyst from said catalyst regeneration zone to contact with said hydrocarbon stream in said cracking zone; the method for decreasing the amount of sulfur oxides in said flue gas which comprises the steps of:

(1) forming at least one sulfur-containing solid material by contacting said sulfur oxide-containing flue gas with a zeolitic crystalline aluminosilicate contained in a particulate solid other than said particulate catalyst in said regeneration zone at a temperature in the range from 1000° F. to 1500° F., at least a majority of ion-exchangeable cationic sites in said aluminosilicate being filled by cations selected from sodium cations and potassium cations, whereby a substantial portion of sulfur in said sulfur oxides combines with said aluminosilicate to form said sulfur-containing solid material, and removing said flue gas from said regeneration zone; and (2) forming fluid sulfur compounds by contacting said sulfur-containing solid material with said hydrocarbon stream in said cracking zone at a temperature in the range from 800° F. to 1300° F. in admixture with said cracking catalyst, and removing said fluid sulfur compounds from said cracking zone with said hydrocarbon effluent.

3. The method of claim 2 wherein said zeolitic crystalline aluminosilicate further includes vanadium cations in a minority of ion-exchangeable cationic sites thereof.

4. The method of claim 2 wherein said particulate solid includes from 0.01 to 4 weight percent of a vanadium component, calculated as the metal, said vanadium component being included in said solid in a form selected from anions including said vanadium component and cations including said vanadium component.

5. The method of claim 2 wherein said zeolitic crystalline aluminosilicate is selected from zeolite X, zeolite Y and natural faujasite.

6. In a fluid catalyst cracking process including the steps of (a) cracking a sulfur-containing hydrocarbon stream in contact with a fluidized bed of a particulate cracking catalyst in a cracking zone at cracking conditions including a temperature in the range from 800° F. to 1300° F., whereby sulfur-containing coke is deposited on said catalyst, and removing a hydrocarbon effluent from said cracking zone; (b) passing catalyst with sulfur-containing coke deposited thereon from said cracking zone and an oxygen-containing gas into a cracking catalyst regeneration zone, burning off said sulfur-containing coke therein at a temperature in the range from 1000° F. to 1500° F. to form a flue gas containing sulfur oxides, and removing said flue gas from said catalyst regeneration zone; and (c) returning the resulting coke-depleted catalyst from said catalyst regeneration zone to contact with said hydrocarbon stream in said cracking zone; the method for decreasing the amount of sulfur oxides in said flue gas which comprises the steps of:

(1) forming at least one sulfur-containing solid material by contacting a zeolitic crystalline aluminosilicate included in at least a portion of said coke-depleted particulate catalyst with sulfur oxides in said flue gas in said regeneration zone at a temperature in the range from 1000° F. to 1500° F., at least a majority of ion-exchangeable cationic sites in said aluminosilicate being filled by cations selected from sodium cations and potassium cations whereby a substantial portion of sulfur in said sulfur oxides combined with said aluminosilicate to form said sulfur-containing solid material, and removing said flue gas from said regeneration zone; and (2) forming fluid sulfur compounds by contacting said sulfur-containing solid material with said hydrocarbon stream in said cracking zone at a temperature in the range from 800° F. to 1300° F., and removing said fluid sulfur compounds from said cracking zone with said hydrocarbon effluent.

7. The method of claim 6 wherein said zeolitic crystalline aluminosilicate further includes vanadium cations in a minority of ion-exchangeable cationic sites thereof.

8. The method of claim 6 wherein said particulate catalyst includes from 0.001 to 4 weight percent of a vanadium component, calculated as the metal, said vanadium component being included in said solid in a form selected from anions including said vanadium component and cations including said vanadium component.

9. The method of claim 6 wherein said zeolitic crystalline aluminosilicate is selected from zeolite X, zeolite Y and faujasite.

10. In a process for cracking sulfur-containing hydrocarbons in the absence of added molecular hydrogen in a cracking system employing an inventory of particulate solids comprising cracking catalyst particles, wherein said inventory is circulated between a cracking zone and a catalyst regeneration zone, said hydrocarbons are cracked in contact with said catalyst particles and sulfur-containing coke is deposited on said catalyst particles in said cracking zone at cracking conditions including a temperature in the range from 800° F. to 1300° F., sulfur oxides-containing flue gas is formed by burning coke off said catalyst particles in said regeneration zone at catalyst regeneration conditions including a temperature in the range from 1000° F. to 1500° F., and the resulting coke depleted catalyst particles from said regeneration zone are returned to contact with said hydrocarbons in said cracking zone, the method for decreasing the amount of sulfur oxides in said flue gas comprising:

cycling in said inventory of particulate solids a zeolitic crystalline aluminosilicate having at least a majority of ion-exchangeable cationic sites thereof filled by cations selected from sodium cations and potassium cations, forming a sulfur-containing solid in said regeneration zone by contacting said sulfur oxides with said aluminosilicate at said regeneration conditions, and forming hydrogen sulfide in said cracking zone by contacting said sulfur-containing solid with said hydrocarbons at said cracking conditions.

* * * * *